United States Patent [19]
Tobishima et al.

[11] Patent Number: 5,270,134
[45] Date of Patent: Dec. 14, 1993

[54] NON-AQUEOUS SECONDARY LITHIUM BATTERY

[75] Inventors: Shin-Ichi Tobishima; Kunio Moriya, both of Vancouver, Canada

[73] Assignee: Advanced Energy Technologies Inc., Burnaby, Canada

[21] Appl. No.: 773,809

[22] Filed: Oct. 9, 1991

[30] Foreign Application Priority Data

Jun. 28, 1991 [CA] Canada .................. 2045996

[51] Int. Cl.⁵ .................. H01M 6/16; H01M 4/48
[52] U.S. Cl. .................. 429/197; 429/218
[58] Field of Search .................. 429/218, 197, 194

[56] References Cited

U.S. PATENT DOCUMENTS

| | | |
|---|---|---|
| Re. 33,306 | 8/1990 | Hayashi et al. |
| 4,118,550 | 10/1978 | Koch . |
| 4,489,145 | 12/1984 | Abraham et al. . |
| 4,550,067 | 10/1985 | Horibu et al. . |
| 4,737,424 | 4/1988 | Tobishima et al. . |
| 4,740,433 | 4/1988 | Lu . |
| 4,753,859 | 6/1988 | Brand et al. . |
| 4,786,499 | 11/1988 | Slane et al. . |
| 4,803,137 | 2/1989 | Miyazaki et al. . |
| 4,803,138 | 2/1989 | Koyayashi et al. . |
| 4,830,940 | 5/1989 | Keister et al. . |
| 4,863,814 | 9/1989 | Mohri et al. . |
| 4,956,150 | 9/1990 | Henry . |
| 4,956,247 | 9/1990 | Miyazaki et al. . |
| 4,959,282 | 9/1990 | Dahn et al. .......... 429/224 |
| 4,965,150 | 10/1990 | Dahn et al. .......... 429/194 |
| 4,969,254 | 11/1990 | Dahn et al. . |
| 5,030,528 | 7/1991 | Shen et al. .......... 429/197 |
| 5,079,109 | 1/1992 | Takami et al. .......... 429/197 |

FOREIGN PATENT DOCUMENTS

| | | |
|---|---|---|
| 926928 | 5/1973 | Canada . |
| 1043866 | 12/1978 | Canada . |
| 1177114 | 10/1984 | Canada . |

OTHER PUBLICATIONS

Tobishima et al.; Electrochim. Acta.; 29(10); 1471–1476 (1984); "Ethylene Carbonate/Ether Mixed Solvents Electrolyte for Lithium Batteries."

Tobishima et al.; Electrochim. Acta.; 29(2); 267–271 (1984); "Ethylene Carbonate-Propylene Carbonate Mixed Electrolytes for Lithium Batteries".

Tobishima et al.; Journ. of Power Sources; 20 (1987) 293–297; "Ethylene Carbonate/Ether Solvents for Electrolytes in Lithium Secondary Batteries."

Laman et al.; Journ. of Power Sources; 24; 195–206 (1988); "Effect of Discharge Current on Cycle Life of a Rechargeable Lithium Battery".

Shen et al.; The Electrochemical Society Inc.; 90-5; 114–126 (1990); "Reactivity of Nonaqueous Organic Electrolytes Towards Lithium".

*Primary Examiner*—John S. Maples
*Attorney, Agent, or Firm*—Browdy and Neimark

[57] ABSTRACT

The present invention provides an electrolyte for use in a secondary lithium battery comprising (i) vanadium oxide-based cathode active material having a molar ratio of oxygen to vanadium between two and three, (ii) an anode active material selected from the group consisting of lithium, lithium ion dischargeable alloys, lithium ion dischargeable intercalation or insertion compounds, and (iii) an electrolyte solution of lithium salt(s) dissolved in a mixed organic solvent. The organic solvent is a mixture of three kinds of solvents, namely ethylene carbonate (EC), propylene carbonate (PC) and 2-methyltetrahydrofuran (2MeTHF) in the following ratio:

EC (x)PC(y)2MeTHF(z)

where x, y and z are volumetric mixing percentages of each solvent, and $x+y+z=100$, $x<y$, $z<y$ and $x+y>50$ (or $z<50$). The resultant secondary lithium battery has a good charge-discharge cycle life and is safe.

16 Claims, 1 Drawing Sheet

NON-AQUEOUS SECONDARY LITHIUM BATTERY

BACKGROUND OF THE INVENTION

1. Field of the Invention

The present invention relates generally to a secondary lithium battery, and particularly to a secondary battery containing an organic electrolyte.

2. Prior Art

Secondary lithium batteries have a much higher energy than conventional batteries, such as lead-acid or Ni-Cd batteries, because of a high electrode potential and the light weight of the lithium. Several kinds of small coin-type lithium secondary batteries have already been commercialized. However, secondary lithium batteries of a larger size, such as AAA to D size, are not readily available yet, mainly due to two reasons. The first reason is the poor rechargeability of lithium in an organic electrolyte. In other words, the charge-discharge cycling efficiency of lithium is low. The second reason relates to safety problems associated with the larger size cell. The large size cell may generate a lot of gases, may catch fire or in extreme cases, may explode under some cycling conditions such as extremely high current discharge or heating. There is a strong correlation between both of the problems enumerated above and the combination of electrolyte, anode and cathode materials.

Although lithium can be used to make a high energy battery, the high activity of lithium can also make the battery unsafe. Lithium reacts with organic solvents thermodynamically to form films on the surface of the lithium, usually accompanied with gas generation as by-product. This is an exothermic reaction which can lead to the melting of the lithium which has a low melting point (180° C.). Once the lithium has melted, it can react directly and vigorously with the cathode and electrolyte, producing more heat inside the battery and further accelerating these reactions. Also, some decomposition products or electrolyte itself may be easily burnt. After cycling, the battery is less safe. The morphology for lithium deposition worsens with each cycle, increasing the surface area of the highly reactive deposited Li. Therefore, by improving Li cycling efficiency by making the lithium electrochemically active, one is faced by the drawback of concomitantly making the battery unsafe.

Thus, in order to have a practical application of an electrolyte for a secondary lithium battery, both Li cycling efficiency and cell safety should be considered and satisfied. To realize this, the electrolyte materials and the composition should be optimized to each cathode.

Many kinds of organic electrolytes have been proposed to improve lithium cycling efficiency, although the safety of these are seldom demonstrated or addressed in the art. Up to now, the use of 2-methyltetrahydrofuran (2MeTHF) as a component of the electrolyte appeared to be promising in terms of improving the lithium cycling efficiency. For example, 2MeTHF-single solvent electrolyte has been proposed, based on the lithium cycling efficiency measurements by using a lithium-half-cell [V.R.Koch, U.S. Pat. No. 4,118,550 (1978)]. The addition of 2-methylfuran (2MeF) to 2MeTHF or a mixture of 2MeTHF and ether, such as nonsubstituted THF, has also been suggested [K. H. Abraham, J. S. Foos and S. B. Brummer, U.S. Pat. No. 4,489,145 (1988)] based on the cycling results of TiS2/Li cells. The addition of ethylene carbonate (EC) to 2MeTHF has also been proposed. For example, EC/2MeTHF-binary mixed solvent systems show better cycleability for V205/Li cells, where at least more than 50% 2MeTHF in volume is necessary to obtain the highest lithium cycling efficiency [S. Tobishima, M. Arakawa, T. Hirai and J. Yamaki, U.S. Pat. No. 4,737,424 (1988)]. Also, EC/2MeTHF (10/90) is recommended for TiS2/Li cells to improve Li cycling efficiency [D. H. Shen, S. Subbarao, F. Deligiannis, C. K. Huang and G. Helpert, proceeding on the symposium on 'Rechargeable Lithium Batteries', proceedings volume 90-5, The Electrochemical Society Inc., pp. 114-126, (1990)]. The addition of propylene carbonate (PC), which has a similar chemical structure to EC, to 2MeTHF was examined by Li-half-cell cycling tests [S. Tobishima and A. Yamaji, Electrochim. Acta., vol. 29, No. 10, pp. 1471-1476 (1984)]. The effects of PC addition on Li cycling efficiency was much smaller than that of EC. Also, EC/PC/2MeTHF in a preferred ratio of 12.5/12.5/75 has been disposed for a VO2/Li cell [J. R. Dahn, T. V. Buuren and U. Vonsacken, U.S. Pat. No. 4,965,150 (1990). In all of the cases mentioned above relating to 2MeTHF-based electrolytes, at least more than 50% 2MeTHF content is necessary to obtain the longest cycle life. However, the Applicant has found that a high 2MeTHF content causes a major problem from a practical point of view. 2MeTHF is easily flammable, has a flash point of $-11°$ C. and is volatile. It has a boiling point of about 80° C. under 760 Torr of pressure and easily oxidizes to produce the explosive peroxide. From a practical standpoint, while the use of a large amount of 2MeTHF will increase the cycling efficiency of the lithium, it will also make the cell unsafe. Therefore, it is essential to optimize the amount of 2MeTHF to be used for each cathode chemistry.

An EC/PC (ester/ester) mixed solvent system has been disclosed for a rechargeable MoS2/Li cell [F. C. Laman and K. Brandt, J. Power Sources, vol. 24, pp. 195-206 (1988)]. EC and PC have a high boiling point and flash point. Although for V205/Li cell and Li-half-cell cycling, EC/PC shows worse Li cycling efficiency than EC/2MeTHF, EC/PC may be safer than ether-electrolytes (S. Tobishima, M. Arakawa, T. Hirai and J. Yamaki, J. Power Sources, vol. 20, pp. 293-297, (1987)). In addition, to improve Li cycling efficiency and safety of the NbSe3/Li battery, the effects of addition of glymes to EC/PC has been reported [L.E. Brand, U.S. Pat. No. 4,753,859 (1988)]. However, suitable electrolyte material and composition are required to be determined in regard to both cycle life and safety.

Many kinds of cathode active materials have also been proposed for secondary lithium battery. Among them, vanadium oxide-based materials are promising in regard to energy and cycle life. For example, crystalline and amorphorous V205 and V6013 have a high energy and a long cycle life. Also, lithiated vanadium oxides, such as Li $\alpha$ V308 (1.0= <$\alpha$= <1.2), are known. As a suitable electrolyte system for the cell with vanadium oxide as a cathode active material, EC/2MeTHF mixed solvent electrolytes have been proposed for a long cycle life [S. Tobishima, M. Arakawa, T. Hirai and J. Yamaki, J.Power Sources, vol.20, pp. 293-297, (1987)]. However, this electrolyte from the practical standpoint, has the drawback as to safety mentioned above.

Accordingly, it is an object of the invention to provide an electrolyte for use in a secondary lithium battery, which has good cycling efficiency and is safe.

SUMMARY OF THE INVENTION

The present invention provides a secondary lithium battery comprising an anode lithium active material, a cathode vanadium oxide active material, and an electrolyte solution containing at least one lithium salt dissolved in an organic solvent; said organic solvent comprising ethylene carbonate (EC), propylene carbonate (PC) and 2-methyltetrahydrofuran (2MeTHF) in the following ratio:

EC(x)PC(y)2MeTHF(z), where $x+y+z=100$, $x<y$, $z<y$, $x+y>50$ (or $z<50$).

This invention further provides a secondary lithium battery comprising: (i) an anode active material selected from the group consisting of lithium, lithium ion dischargeable alloys, lithium ion dischargeable intercalation or insertion compounds, (ii) a cathode active material reacting with lithium ions through electrochemically reversible reaction including vanadium oxide-based compounds having a molar ratio of oxygen to vanadium between two and three, and (iii) an electrolytic solution containing one or more lithium salts dissolved in an organic solvent, said organic solvent being a mixed solvent consisting essentially of ethylene carbonate (EC), propylene carbonate (PC) and 2-methyltetrahydrofuran (2MeTHF) in the following ratio:

EC(x)PC(y)2MeTHF(z), where $x<y$, $z<y$, $x+y+z=100$, $x+y>50$ or $z<50$.

In a preferred embodiment, the 2MeTHF content is less than 35%, and the ratio of EC/PC in EC/PC/2HeTHF is 5/95 to 45/55, assuming EC and PC total 100.

BRIEF DESCRIPTION OF THE DRAWING

The present invention will be better understood from the following description taken in conjunction with the accompanying drawing in which.

DETAILED DESCRIPTION OF THE INVENTION

Figure 1:
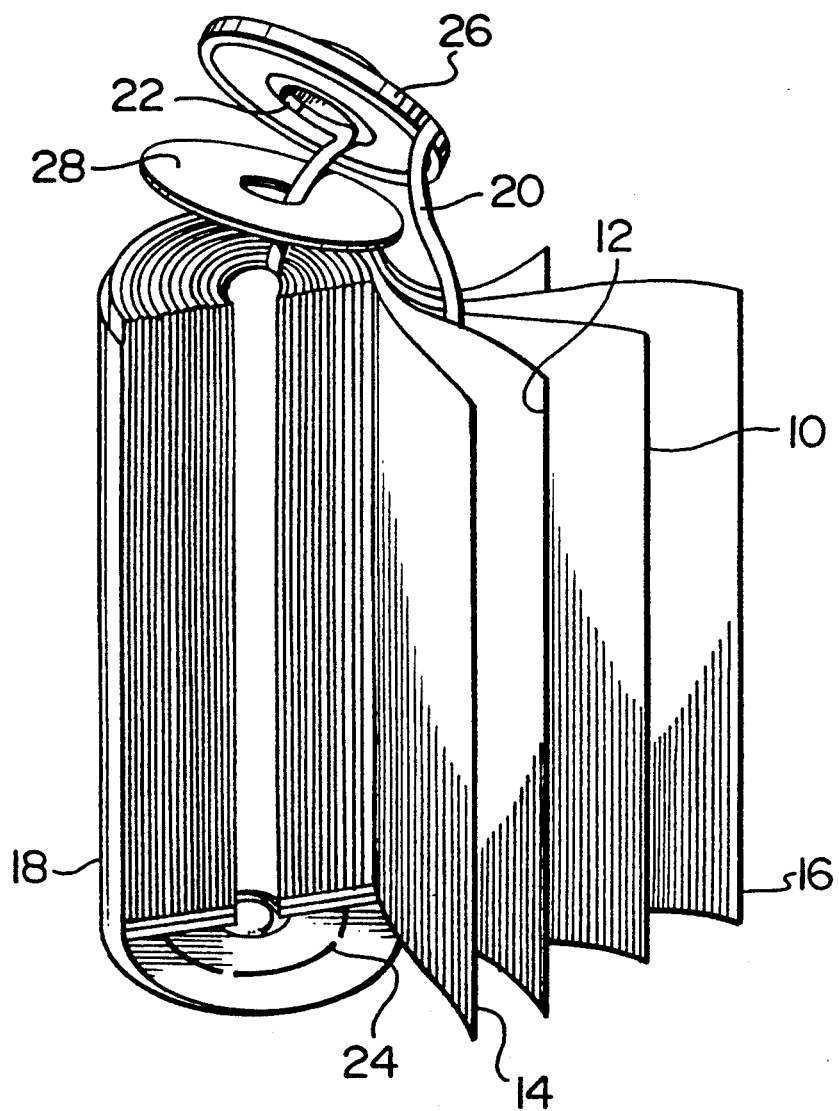
FIG. 1 is an exploded view in cross-section of a cell according to one embodiment of the present in invention.

It is required that the electrolytic solution used in a secondary lithium battery have a high charge-discharge cycling efficiency. As described above, lithium reacts with the electrolyte solution to form a film on the surface of the lithium. The charge-discharge characteristics of lithium are significantly affected by the formation rate of film, ion conductivity, electron conductivity, porosity and other physical properties including mechanical strength or flexibility of the thus formed film. Therefore, in order to improve cycle life of a Li anode, EC and 2MeTHF are necessary. However, as described above, the use of too much 2MeTHF may make the cell unsafe. If the content of 2MeTHF is reduced for EC/2MeTHF binary mixed solvent electrolyte, another kind of practical problem will arise. Because of the high melting point of EC (36° C.), the low temperature performance of the battery must be sacrificed when the content of EC exceeds 50 vol.%. When PC is used instead of EC, the cycleability is decreased. From the results of Li-half-cell cycling tests, it can be seen that Li cycling efficiency increases with an increase in EC content in an EC/PC electrolyte [S. Tobishima and A. Yamaji, Electrochim.Acta, vol. 29, No. 2, pp. 267-271 (1984)]. However, EC/PC (50/50) is generally used because of low temperature operation problems. However, the Applicant has found that it is better to use an EC/PC electrolyte having more PC than EC for a vanadium oxide cathode. This is different from what would be expected having regard to the cycleability of lithium itself.

Cells of various structures and sizes may be used in the practice of the invention, FIG. 1 being illustrative of one of the cell structures which can be used. The cell structure of FIG. 1 is often referred to as a rolled cylindrical cell structure. It comprises four layers: the negative electrode 10 (e.g. the lithium metal foil itself), the separator 12, the positive electrode 14 (e.g. vanadium oxide) and another separator layer 16. The layers are rolled into a cylindrical shape and inserted into a cylindrical container 18 with suitable electrical connections 20 and 22 to the positive electrode 10 and the negative electrode 12, respectively. The container 18 has a vent 24 on its bottom to allow the release of built-up gases so as to prevent explosion of the cell during operation. A cap 26 is used to close the top end of the container 18. Between the cap 26 and the cylindrical cell structure is placed an insulating disc 28. The cylindrical container 18 is filled with electrolyte to permit electrochemical reaction.

The electrolyte composition is generally defined as follows:

EC(x)PC(y)2MeTHF(z), where $x<y$, $z<y$, $x+y+z=100$, $x+y>50$ or $z<50$.

In a preferred embodiment, the 2MeTHF content is less than 35%, and the ratio of EC/PC in EC/PC/2HeTHF is 5/95 to 45/55, assuming EC and PC total 100.

Examples of preferred lithium salts to be dissolved in the aforementioned solvent are $LiPF_6$, $LiAsF_6$, $LiSbF_6$, $LiClO_4$, $LiCF_3SO_3$, $LiN(CF_3SO_2)_2$, $LiC(CF_3SO_2)_3$, $LiCF_3CO_2$, $LiBF_4$, $LiAlCl_4$, $LiBr$ and $LiB(C_6H_5)_4$. One of these lithium salts or a mixture thereof are added to the solvent mixture described above such that the content of lithium salt ranges from about 0.5 to about 2.0 mol/l (M). Outside of this range, a serious reduction in the charge-discharge cycling efficiency of lithium is experienced.

The anode active materials used in the secondary lithium battery of this invention is selected from the group consisting of lithium; lithium ion dischargeable lithium alloys, such as Li-Al or Li-Si alloys; lithium ion dischargeable intercalation or insertion compounds, such as various kinds of carbon materials, polyacenic semiconductors, and metal chalogenides, such as lithium tungsten oxides and niobium oxide. Preferred anode active materials have an electrochemical potential close to that of pure Li, which can avoid the serious decrease in the cell voltage, and a high capacity of capturing or holding Li+ ions and of dicharging Li+ ions, which can avoid the serious decrease in the capacity, compared with pure lithium.

The cathode active material used in the secondary lithium of this invention is a vanadium oxide based material which reacts with lithium ions through an electrochemically reversible reaction having a molar ratio of oxygen to vanadium of between two and three. Preferred materials include crystalline or amorphorous materials mainly composed of $V_2O_5$, $V_6O_{13}$ or $Li_\alpha V_3O_8$ ($1.0 \leq \alpha \leq 1.2$). If it is necessary to modify and to improve the performance of the cathode cell, a small amount of other metal components other than Li or V can be added. For example, when amorphous $V_2O_5$ is used in order to stabilize the amorphous state during charge-discharge cycles, small amounts of so-called 'network former' is often added to $V_2O_5$, such as $V_2O_5-P_2O_5$ ($V_2O_5$: $P_2O_5$ in a molar ratio of about 95:5). Furthermore, in order to improve conductivity, other compounds such as copper oxide are added to the crystalline $V_2O_5$.

The separators 12 and 16 can be made of polymer materials, such as polyethylene and polypropylene in the form of a microporous film.

Both electrical and thermal stability are basic requirements for the cells. The thermal stability mainly reflects the stability of the combination of chemical compounds used in the cell. The cell must be stable at a temperature of at least 60° C., which is usually the upper temperature limit of the working battery. Preferably, the cell will be stable up to a temperature of 100° C.

External short-circuit tests determine the electrical stability of the cells. In this test the positive and negative terminal are connected through a very low resistance media. All the batteries energy then flows as current in a very short period, which increases the internal temperature of the cell.

The following examples are used to illustrate the concept of the present invention and are not to be considered as limiting the invention set forth in the appended claims.

EXAMPLE 1

A cylindrical cell as shown in FIG. 1 was fabricated using amorphous $V_2O_5 0P_2O_5$ ( $V_2O_5:P_2O_5=95:5$ in molar ratio) as a cathode active material and Li as an anode material. Four different kinds of electrolyte solutions were used to compare the cycle and safety characteristics of the cells. One such comparison test is described below. The four electrolytes used for the cells were as follows:

Electrolyte (A):1M $LiAsF_6$-EC/PC/2MeTHF(30/40/30),
Electrolyte (B):1M $LiAsF_6$-EC/PC/2MeTHF(15/70/15),
Electrolyte (C):1M $LiAsF_6$-EC/2MeTHF(50/50), and
Electrolyte (D):1M $LiAsF_6$-EC/PC(50/50).

The electrolytes (C) and (D) are already known and are reference electrolytes to show the effects of the electrolytes (A) and (B) which are involved in this invention. Electrolyte (C) is known to show the excellent charge-discharge cycle performance. Electrolyte (D) is one of the conventional electrolyte to show the relatively better charge-discharge cycle performance and safety and is already used for commercialized secondary lithium batteries made by Moli Energy of Canada.

The charge-discharge cycling tests, on these cells were carried out with a charging current of 100 mA and a discharging current of 600 mA. Cycles were carried out between 3.5 and 1.8 V. Cycleability of the cell was evaluated by using FOM (Figure of Merit) value, which is defined as follows:

FOM =[accumulated discharge capacity]/ [theoretical capacity of lithium initially put into the cell]

The FOM is related to the Li cycling efficiency, E, as follows:

FOM = 1/ (1-E)

The FOM values were compared when the discharge capacity reached 50% of the initial capacity. These FOM values are shown as FOM-R in this text. FOM-R is the ratio of FOM value, compared with FOM for the conventional electrolyte (D) and is defined as follows:

FOM-R =[FOM of highlighted electrolyte]/ [FOM of 1M $LiAsF_6$-EC/PC(50/50)]

As shown in Table 1, the electrolyte (C) can cycle well in a cell with vanadium oxide cathode active material. The FOM values of the cells with electrolyte (A) and (B) were 93% and 90% that with electrolyte (C), respectively. The FOM values of the cells with electrolyte (A) and (B) were twice as high as that of cells using conventional electrolyte (D). Having regard to cell cycleability, electrolyte (C) is better. However, the difference of cycleability between these three electrolytes is not significant.

TABLE 1

| Electrolytes | Relative Cycle Life, FOM-R |
|---|---|
| (A) | 1.9 |
| (B) | 1.8 |
| (C) | 2.0 |
| (D) | 1.0 |

Heating tests were carried out to determine the thermal stability of the cells. Furthermore, external short-circuit tests, which determine electrical stability were conducted.

Heating tests were carried out with the cells containing the above-mentioned electrolytes (A), (B), (C) and (D). The cells were heated up to 130° C. and stored at this temperature for 2 hours. The results are shown in Table 2. In this experiment, the cell tested with electrolyte (C) showed vent opening with vigorous gas generation. Nothing happened to the cells with electrolyte (A), (B) and (D). In other words there was no detectable cell temperature increase, no voltage drop, no vent opening, no gas generation, no explosion, or no fire.

TABLE 2

| Electrolytes | Heating Test at 130° C. for uncycled cells |
|---|---|
| (A) | No vent open, No voltage drop, No fire, No explosion |
| (B) | No vent open, No voltage drop, No fire, No explosion |
| (C) | Vent opening with vigorous gas generation |
| (D) | No vent open, No voltage drop, No fire, No explosion |

With regard to the cells with electrolyte (A) and (B), the heating tests at 130° C. and short-circuit tests at 21° C. and 55° C. were carried out after 50 charge-discharge cycles under the same cycling conditions as mentioned above. Table 3 and 4 show these results. Again, no detectable changes, to the cells were observed.

TABLE 3

| Electrolytes | Heating Test at 130° C. for cells cycled 50 times |
|---|---|
| (A) | No vent open, No voltage drop, No fire, No explosion |
| (B) | No vent open, No voltage drop, No fire, No explosion |

TABLE 4

| Electrolytes | Short circuit test at 21° C. and 55° C. for cells cycled 50 times |
|---|---|
| (A) | No vent open, No fire, No explosion |

TABLE 4-continued

| Electrolytes | Short circuit test at 21° C. and 55° C. for cells cycled 50 times |
|---|---|
| (B) | No vent open, No fire, No explosion |

EXAMPLE 2

A cell was fabricated, as described in Example 1 and the further two electrolytes were tested:

Electrolyte (E): 1M LiPf$_6$-DC/PC/2MeTHF(15/70/15), and

Electrolyte (F): 1MLiN(CF$_3$SO$_2$)$_2$-EC/PC/2MeTHF(15/70/15).

Heating tests at 130° C. and short-circuit tests were carried out after 50 charge-discharge cycles, as described in Example 1. It is well known in the art, that LiPF$_6$ is unstable and will decompose above 70° C. However in the mixed organic solvent of the present invention the cells remained stable, as shown in Table 5.

TABLE 5

| Electrolytes | Heating Test at 130° C. or Short circuit test at 21° C. and 55° C. for cells cycled 50 times |
|---|---|
| (E) | No vent open, No fire, No explosion |
| (F) | No vent open, No fire, No explosion |

EXAMPLE 3

A cell with a V$_2$O$_5$-P$_2$O$_5$ as a cathode active material and a Li as an anode was fabricated, as described in Example 1. Cells with electrolyte (B) were heat tested at 130° C. and short-circuit tested at 21° C. and 55° C. The cells were cycled 10 times, before abuse testing, with a charging current of 60 mA which is 10% of the discharge current of Example 1. Cycles were carried out between 3.3 and 1.8 V. Lowering the discharging current makes the morphology of the plated Li, after charging, mossy or porous and therefore makes the cell unsafe. Furthermore, the lower discharging current may lead to an internal short circuit (direct contact between Li and the cathode) inside the cell by penetration through the separator of needle-like (dendrite) Li deposits. This also will make the cell unsafe and also inoperable.

As shown in Table 6, under the test conditions described above, the cells did not show any gas venting after heating at 130° C. or in the short-circuit tests at 21° C. or 55° C.

TABLE 6

| Electrolytes | Heating Test at 130° C. or Short circuit test at 21° C. and 55° C. for cells cycled 10 times |
|---|---|
| (B) | No vent open, No fire, No explosion |

Furthermore, the cells did not experience any internal shorts, throughout the test period. Conventional electrolytes, such as LiAsF$_6$-EP/PC, experienced an internal short before cycle life ends. This internal short is clearly detected by longer charge capacity than discharge capacity and by the untable charge voltage profile during charging. By this internal short of the cell, the cell with conventional electrolyte showed only half cycle life of the cell with electrolyte (B), as shown in Table 7.

TABLE 7

| Electrolytes | Relative Cycle Life, FOM-R |
|---|---|
| (B) | 1.8 |
| (D) | 1.0 |

EXAMPLE 4

A cylindrical cell, as shown in FIG. 1, was fabricated using lithiated amorphous V$_2$O$_5$-P$_2$O$_5$ as the cathode active material and Li as an anode, with electrolytes (A) and (D). The cell was cycled under discharge current of 600 mA and charge current of 100 mA, with 1.8-3.5 V. Table 8 shows the cycling results. The electrolyte (A) shows about twice longer cycle life than electrolyte (D). Table 9 shows the heating test and short-circuit test results for the cell with electrolyte (A). Nothing dangerous happened to the cells with electrolyte (A).

TABLE 8

| Electrolytes | Relative Cycle Life, FOM-R |
|---|---|
| (A) | 1.6 |
| (D) | 1.0 |

TABLE 9

| Electrolytes | Heating Test at 130° C. or Short circuit test at 21° C. and 55° C. for cells cycled 50 times |
|---|---|
| (A) | No vent open, No fire, No explosion |

As long as the content of 2MeTHF was less than 50 vol%, the same results were obtained when the mixing ratio of EC, PC and 2MeTHF were changed and different kinds of Li salts were used. Therefore, the strongest factor affecting the safety of the cell is the content of 2MeTHF in the electrolytes.

EXAMPLE 5

The cell, as shown in FIG. 1, was fabricated using crystalline V$_2$O$_5$ as the cathode active material and Li-Al alloy as an anode, with various electrolyte mixtures of EC, PC and 2MeTHF. These cells were cycled under discharge current of 600 mA and charge current of 100 mA with 1.8-3.5 V. Examples of the electrolytes tested are as follows:

Electrolyte (B):1M LiAsF$_6$-EC/PC/2MeTHF(15/70/15),

Electrolyte (G):1M LiAsF$_6$-EC/PC/2MeTHF(5/80/15),

Electrolyte (H):1M LiAsF$_6$-EC/PC/2MeTHF(30/55/15), and

Electrolyte (I):1M LiAsF$_6$-EC/PC/2MeTHF(42.5/42.5/15).

Table 10 shows the examples of the test results. It was determined that EC content should be less than PC content to obtain a long cycle life. After the cycle ended, the heating test at 130° C. was carried out for all cells tested. All cells were stable because 2MeTHF is less than 50%.

TABLE 10

| Electrolytes | Relative Cycle Life, FOM-R |
|---|---|
| (B) | 1.6 |
| (G) | 1.5 |
| (H) | 1.4 |
| (I) | 1.0 |

Although preferred embodiments of the invention are described herein in detail, it will be understood by those skilled in the art that variations may be made thereto without departing from the spirit of the invention or the scope of the appended claims.

The embodiments of the invention in which an exclusive property or privilege is claimed are as follows:

1. A secondary lithium battery comprising an anode lithium active material, a cathode vanadium pentoxide active material further comprising $V_2O_5$—$P_2O_5$ active material, and an electrolyte solution containing at least one lithium salt dissolved in an organic solvent; said organic solvent comprising ethylene carbonate (EC), propylene carbonate (PC) and 2-methyltetrahydrofuran (2MeTHF), in the following mixing volume ratio:

EC(x)PC(y)2MeTHF(z), where x+y+z=100, x<y, z<y, x+y>50 (or z<50) and z is greater than zero.

2. The secondary battery according to claim 1, wherein z is less than 35% and the ratio of EC to PC is 5:95 to 45:55 when x+y is taken as 100.

3. The secondary lithium battery according to claim 2, wherein the amount of $V_2O_5$ to $P_2O_5$ occurs in a molar ratio of about 95;5.

4. The secondary lithium battery according to claim 1, wherein the anode lithium active material is selected from the group consisting of lithium, lithium ion dischargeable lithium alloys, lithium ion dischargeable intercalation or insertion compounds.

5. The secondary lithium battery according to claim 1, wherein the lithium salt is selected from the group consisting of: $LiPF_6$, $LiAsF_6$, $LiSbF_6$, $LiClO_4$, $LiCF_3SO_3$, $LiN(CF_3SO_2)_2$, $LiC(CF_3SO_2)_3$, $LiCF_3CO_2$, $LiBF_4$, $LiAlCl_4$, $LiBr$ and $LiB(C_6H_5)_4$.

6. The secondary lithium battery according the claim 8, wherein the amount of the concentration of lithium salt ranges from about 0.5 M to about 2.0 M.

7. The secondary lithium battery according to claim 2, wherein x is 5%.

8. The secondary lithium battery according to claim 2, wherein x is 15%.

9. The secondary lithium battery according to claim 2, wherein x is 30%.

10. The secondary lithium battery according to claim 2, wherein the electrolyte solution is 1M $LiAsF_6$-EC/PC/2MeTHF(30/40/30).

11. The secondary lithium battery according to claim 2, wherein the electrolyte solution is 1M $LiAsF_6$-EC/PC/2MeTHF(15/70/15).

12. The secondary lithium battery according to claim 2, wherein the electrolyte solution is 1M $LiPF_6$-EC/PC/2MeTHF(15/70/15).

13. The secondary lithium battery according to claim 2, wherein the electrolyte solution is 1MLiN$(CF_3SO_2)_2$-EC/PC/2MeTHF(15/70/15).

14. The secondary lithium battery according to claim 2, wherein the electrolyte solution is 1M $LiAsF_6$-EC/PC/2MeTHF(5/80/15).

15. The secondary lithium battery according to claim 2, wherein the electrolyte solution is 1M $LiAsF_6$-EC/PC/2MeTHF(30/55/15).

16. A secondary lithium battery comprising: a lithium anode active material; a cathode vanadium pentoxide active material further comprising $V_2O_5$ and $P_2O_5$ active material, wherein the amount of $V_2O_5$ to $P_2O_5$ occurs in a molar ratio of 95:5, and an electrolyte solution containing at least one lithium salt selected from the consisting of: $LiPF_6$, $LiAsF_6$, $LiSbF_6$, $LiClO_4$, $LiCF_3SO_3$, $LiN(CF_3SO_2)_2$, $LiC(CF_3SO_2)_3$, $LiCF_3CO_2$, $LiBF_4$, $LiBF_4$, $.iAlCl_4$, $LiBr$ and $LiB(C_8H_5)_4$ wherein the concentration of lithium salt ranges from about 0.5 M to about 2.0 M, dissolved in an organic solvent; said organic solvent comprising ethylene carbonate (EC), propylene carbonate (PC) and 2-methyl-tetrahydrofuran (2MeTHF) in the following mixing voluem ratio:

EC(x)PC(y)2MeTHF(z) wherein
x is from 5% to 30%,
y is from 40% to 80%, and
z is from 15% to 30, and
wherein x+y+z=100x<y, z<y and x+y>50.

* * * * *